United States Patent [19]

Kelly

[11] Patent Number: 5,033,761
[45] Date of Patent: Jul. 23, 1991

[54] INFANTS, BABIES AND CHILDRENS CARRIAGE

[75] Inventor: Ray G. Kelly, St. Louis County, Mo.

[73] Assignee: Angeles Nursery Toys, Inc., Pacific, Mo.

[21] Appl. No.: 457,083

[22] Filed: Dec. 26, 1989

Related U.S. Application Data

[63] Continuation-in-part of Ser. No. 291,994, Dec. 30, 1988, Pat. No. D. 312,436.

[51] Int. Cl.⁵ .............................................. B62B 7/04
[52] U.S. Cl. .............................. 280/47.38; 297/243; 297/248; D12/129
[58] Field of Search ............... 280/47.35, 47.38, 642, 280/18, 657, 15, 845, 87.021, 87.043; D12/128, 129, 130; 297/239, 245, 243, 244, 248

[56] References Cited

U.S. PATENT DOCUMENTS

| | | | |
|---|---|---|---|
| D. 152,045 | 12/1948 | Vibber | D12/130 |
| D. 162,495 | 3/1951 | Trimble | D12/129 |
| D. 296,540 | 7/1988 | Perego | D12/129 |
| 1,465,435 | 8/1923 | Higgins | 280/87.043 |
| 1,707,186 | 3/1929 | Chatfield | D12/128 |
| 2,420,088 | 5/1947 | Milburn | D12/129 |
| 2,426,432 | 8/1947 | Breckner et al. | D12/129 |
| 4,834,415 | 5/1989 | Yee | D12/129 |

Primary Examiner—Andres Kashnikow
Assistant Examiner—Richard Camby
Attorney, Agent, or Firm—Paul M. Denk

[57] ABSTRACT

A carriage assembly (10) for babies, infants and small children comprises a frame (12) to which wheels (98) are attached to move the carriage. A handle (74) is also attached to the frame for pushing and pulling the carriage. A multi-tiered seating assembly is mounted on the frame and includes a seat (34) for at least one occupant on each tier of the assembly.

13 Claims, 10 Drawing Sheets

INFANTS, BABIES AND CHILDRENS CARRIAGE

CROSS-REFERENCE TO RELATED APPLICATION

This application is related to the subject matter of and is a continuation-in-part of the United States design patent application having Ser. No. 07/291,994, filed on Dec. 30, 1988, now U.S. Pat. No. 0,312,436, Nov. 27, 1990 both owned by a common assignee.

BACKGROUND OF THE INVENTION

This invention relates to vehicle carrier for children, and more particularly, to a multi-tiered carriage for transporting infants, babies and small children.

In day care and similar child care facilities, transporting children is a major undertaking. Small children, infants and babies, are usually either carried, or placed in strollers to take them from one place to another. For outings to zoos, parks, etc. the movement of even a few children can involve a considerable number of supervising adults because there is no way to easily and safely move more than one or two children at a time. Strollers, for example, typically only carry a maximum of two children. Thus, for every two children on an outing, one adult is needed. If an appreciable number of children are on the trip, the number of adults required may severely strain the personnel resources of the facility. The same rational applies even with the handling of children in a day care center or at a nursery.

On a trip, children should be kept together. This usually requires the adults to continually shepherd the children about. Since small children are naturally inquisitive and like to wander around looking at strange new things, they can easily tire out and out last those adults who have to chase after them. It would better if first, there were some way to require the services of fewer adults on these outings; and second, if there were a way the adults who did go were able to more easily care for their charges, and at the same time, know they were safe.

SUMMARY OF THE INVENTION

Among the several objects of the present invention may be noted the provision of a carriage for babies, infants and small children; the provision of such a carriage for transporting a number of children at the same time; the provision of such a carriage requiring only one adult to operate; the provision of such a carriage which is multi-tiered so children on each tier can readily see and visually experience their surroundings; the provision of such a carriage to have abreast seating to increase the number of children which can be transported at any one time; the provision of such a carriage which children can climb into and out of; the provision of such a carriage to include safety harnesses to protect the children while in the carriage; the provision of such a carriage which is easily steerable, requires only one person to move, and is narrow enough to pass through doorways so as to be moved into and out of buildings; the provision of such a carriage which is lightweight and easy to manuver over paths, curbs, etc.; the provision of such a carriage which provides full back and side support for the occupants; and, the provision of such a carriage which does not tip over.

Another very unique feature of this invention is that because of the determined location for the carriage wheels, the carriage has been made substantially tip proof, so that when infants or small children, when they clamor to enter, or even exit, from the carriage, during usage, the location of the wheels have a tendency to prevent any tipping of the carriage as the children rush to attain perferred seating upon this device.

Another unique feature of this invention is that although the carriage is designed of rather enhanced structure and fabricated to a rather elaborate shape and configuration, it should be noted that the overall width of the carriage is intended to be accurately controlled, and not to exceed either 30½ inches or 36½ inches, in width, and actually be of slightly less transverse dimensions with respect thereto, so that this carriage, in usage, will conveniently fit through most doorways of buildings currently utilized for nurseries, or the like.

Briefly stated, a carriage of the present invention is for transporting babies, infants and small children. The carriage comprises a frame and wheels attached to the frame to move the carriage. A handle is also attached to the frame for pushing and pulling the carriage. A multi-tiered seating assembly is mounted on the frame and includes a seat for at least one occupant on each tier of the assembly. Other objects and features will be in part apparent and in part pointed out hereinafter.

BRIEF DESCRIPTION OF THE DRAWINGS

FIGS. 14 and 15 are respective top plan and side elevational views of a frame assembly for the second embodiment of the carriage; and, FIGS. 16a and 16b are isometric views of floor panels fitting over the carriage frame.

Corresponding reference characters indicate corresponding parts throughout the several views of the drawings.

DESCRIPTION OF PREFERRED EMBODIMENTS

Figure 1:
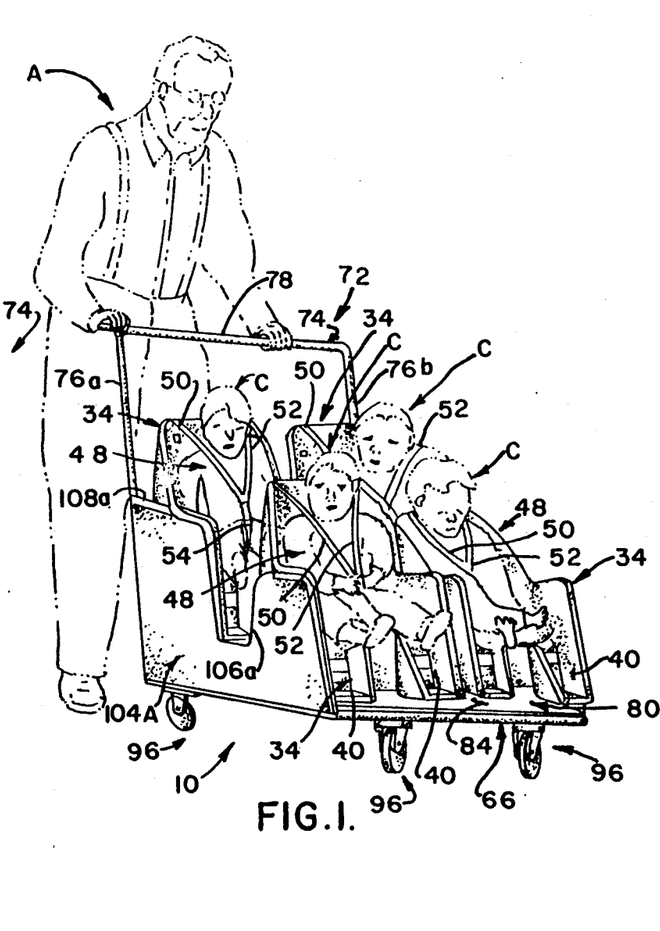
FIG. 1 is an isometric view of a first embodiment of a carriage of the present invention.

Referring to the drawings, a carriage indicated generally at 10 in FIG. 1 is for carrying a number of babies, infants or children C. The carriage is rendered operable by an adult A to transport the children for various indoor and outdoor activities, as aforesaid. The carriage 10 of FIG. 1 (and FIGS. 2-6) is for transporting up to four children; while a carriage 10' (see FIGS. 7-11) is for transporting up to six children. The carriage, as described hereinafter, is designed to safely move children, and at the same time, reduce the number of adults having to accompany the children on an outing. The carriage is particularly useful for childrens' day care and similar type facilities. It is a feature of the carriage that children are seated in an adjacent side-by-side arrangement of two children each. Thus, in carriage 10 there is a front row and rear row with two seats in each row; and, in carriage 10', there are front, middle, and rear rows of seats similarly arranged. Further, the seats are arranged in ascending tiers from front to back so children are progressively seated higher off the ground the further they are seated to the back of the respective carriages. Such a seating plan has the advantage of allowing all the children a better view, especially in the forward direction of the carriage, which helps keep their attention.

Figure 2:
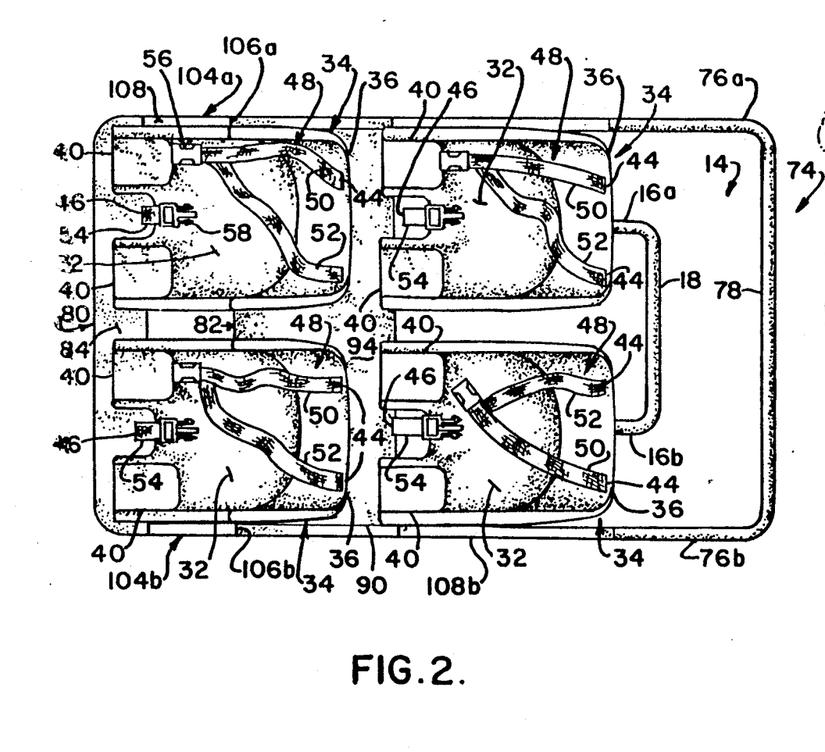
FIG. 2 is a top plan view of the carriage.
Figure 3:
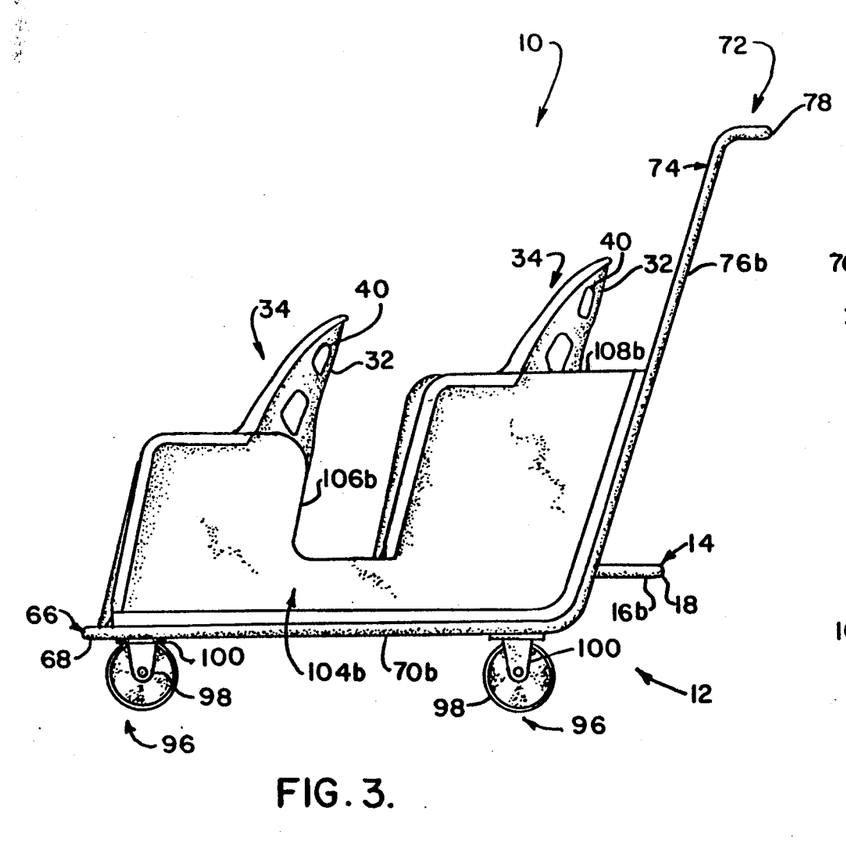
FIGS. 3, 4, and 5 are respective side, front, and rear elevational views of the carriage.
Figure 4:
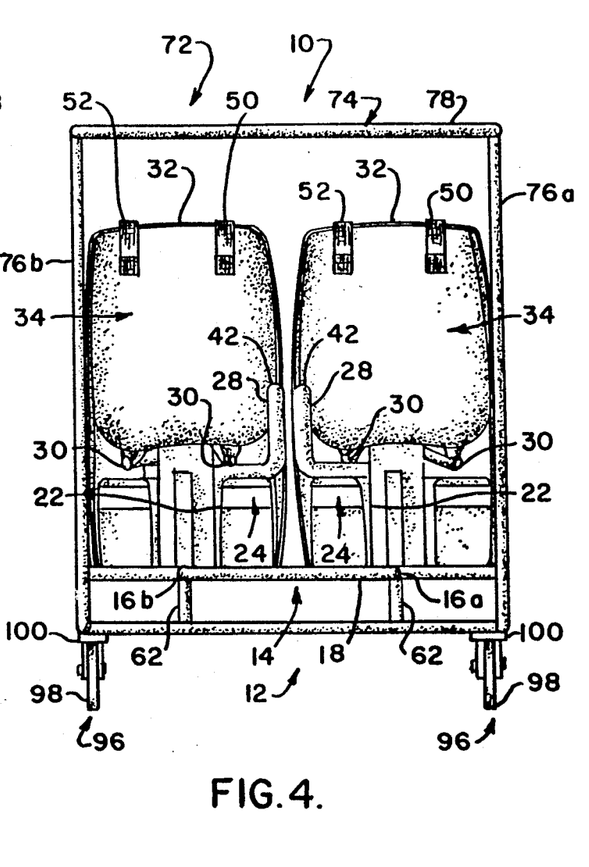
Figure 5:
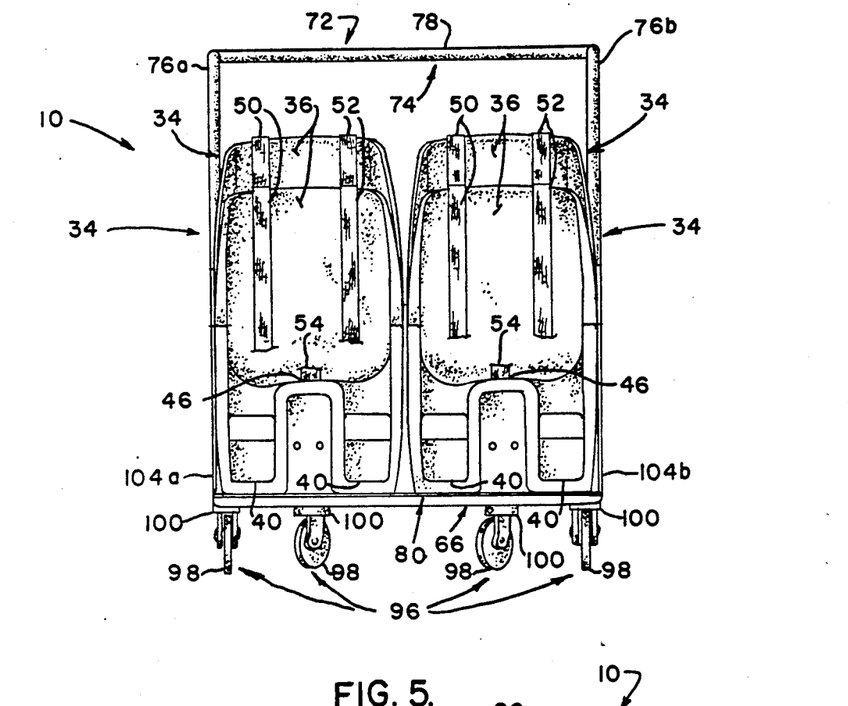
Figure 12:
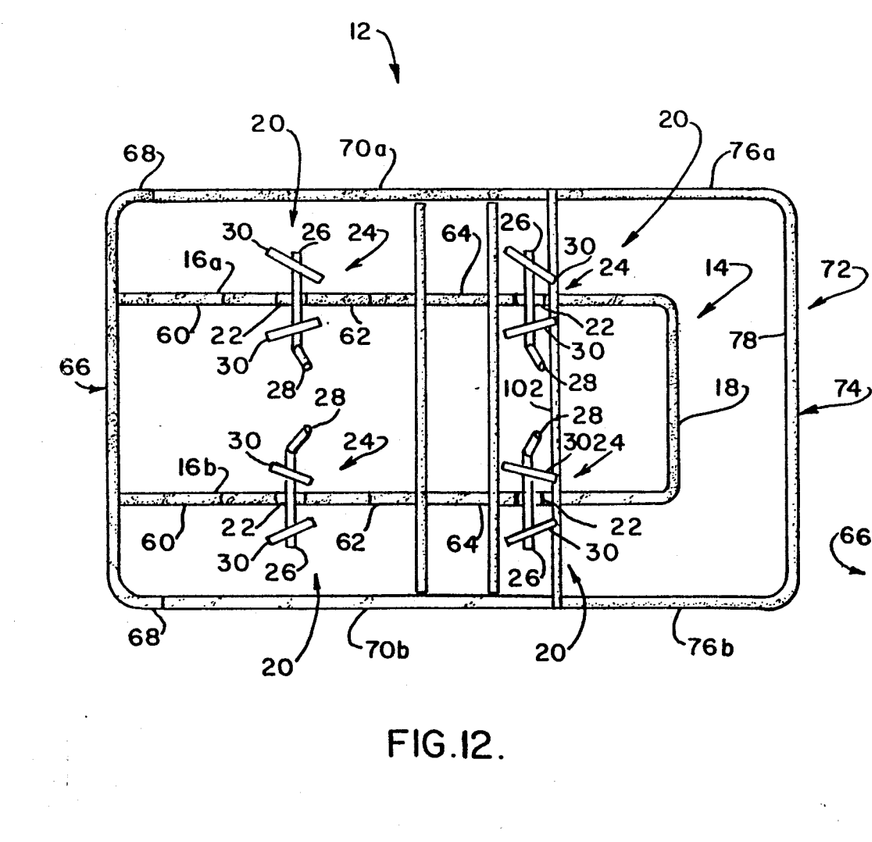
FIGS. 12 and 13 are respective top plan and side elevational views of a frame assembly for the first embodiment of the carriage.
Figure 13:
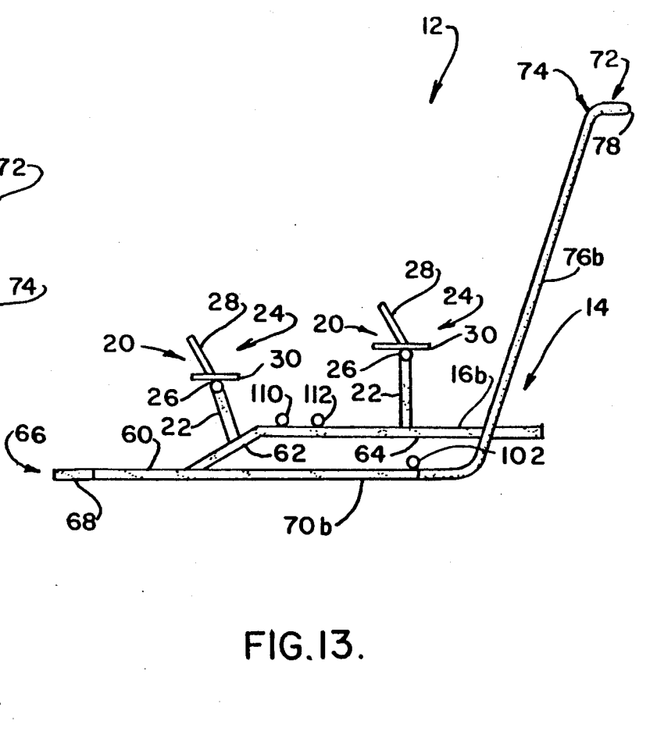
Figure 14:
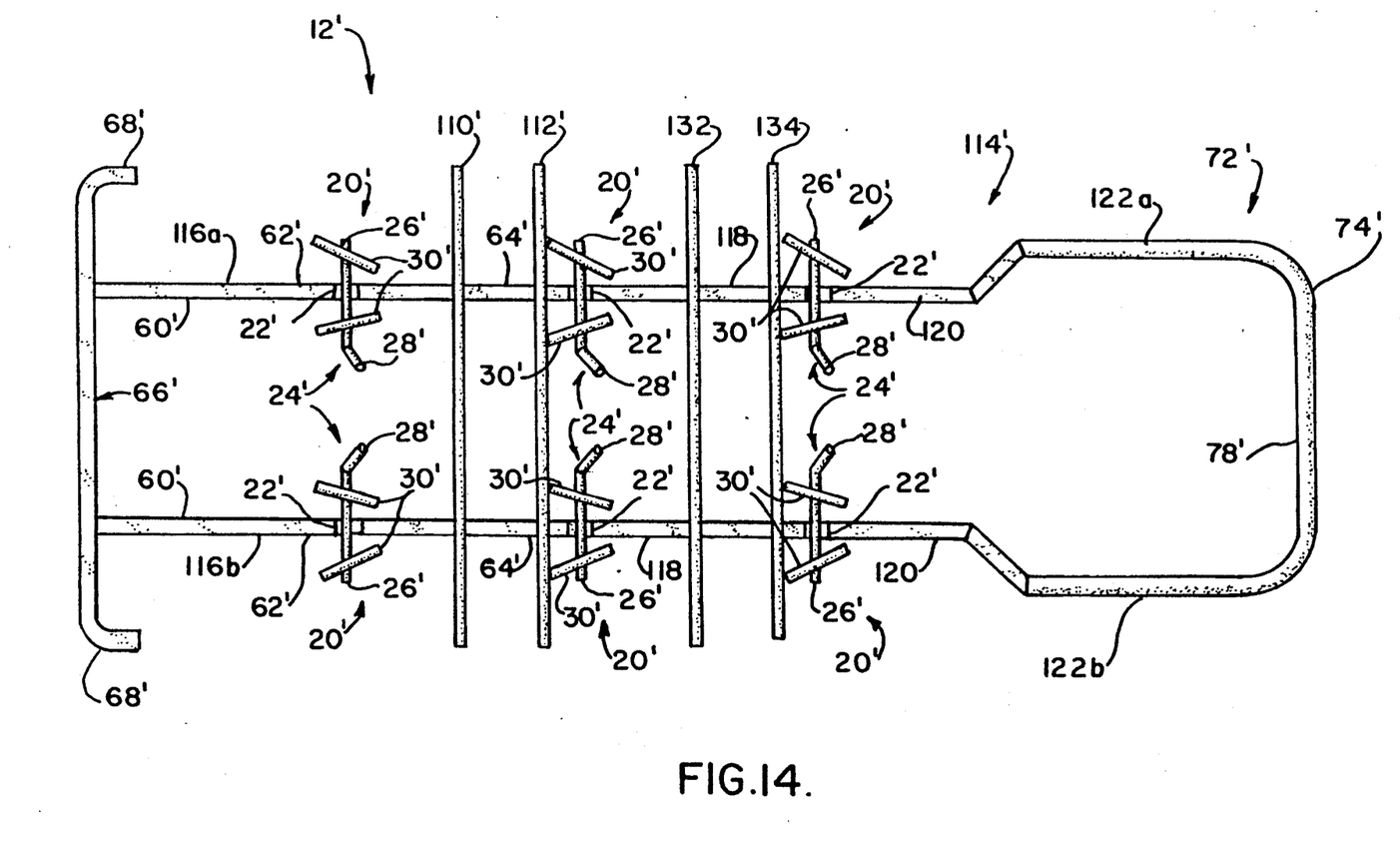

Each carriage has a frame assembly, 12 and 12' respectively. While the assemblies are similar in many respects, each is sufficiently different so they will be separately described. Referring to FIGS. 12 and 13, frame 12 includes a U-shaped frame member 14 whose respective legs 16a and 16b extend longitudinally of the frame. The base 18 of the member is at the rear of the frame. A seating means 20 is attached to the respective legs of member 14 at points intermediate their length. The respective seating means are each identical and are arranged at the same intermediate points along the respective legs so as to provide the side-by-side seating arrangement mentioned above. Each means 20 includes a post 22 extending vertically upwardly from the top of the leg, the bottom of the posts being secured to the legs, for example, by welding. A tubular member 24 is attached to the top of the post and extends transversely to the longitudinal axis of the carriage. Member 24 is generally L-shaped with the long leg 26 of the member being secured to the post at a approximately the midpoint of the length of the leg. Member 24 is also arranged to the short leg 28 of the member and is near the centerline of the carriage and angles upwardly for reasons to be described hereinafter. Between the post and each end of leg 26 of member 24 is a seat mounting bracket 30 which is attached to the top of the leg. The two brackets mounted on each leg are set at angles to each other and extend outwardly toward the front of the carriage The bottoms 32 of seats 34 are bolted to the brackets. The seats are of an integral, contour molded polymer construction. In addition to the seat bottom, each seat has a back 36 which extends around to the sides of the seat. Also, as shown in FIGS. 2 and 5, the seats have a lower front portion 38 with leg wells 40 for the childrens legs. The sides of the seat are folded back on themselves to form a channel 42 (see FIG. 4). Leg 28 of member 24 fits in the channel on the inward side of the seat to brace the seat.

The seat is also formed with openings 44 in the upper back portion of the seat and an opening 46 between the wells 40. A safety harness 48 has straps 50, 52 which are inserted through the openings 44, and a strap 54 which is inserted through opening 46. Straps 50 and 52 fit over the shoulders of a child placed in a seat and the strap 54 extends up between his legs. The end of strap 52 is joined to strap 50, adjacent the end of the strap. Strap 50 has a buckle 56 on its end and strap 54 a latch 58 which is inserted into the buckle to latch the child securely in his seat.

As shown in FIG. 12 and 13, legs 16a, 16b of frame member 14 have a staight section 60 at the forward end of the carriage. The legs then have an upwardly sloping section 62, and another straight section 64. In addition, a frame member 66 extends across the front of the carriage orthogonally to the legs. This member is attached to the legs, for example, by welding and acts as a front bumper for the carriage. The outer ends of the member are both turned rearwardly as indicated at 68. Respective side rails 70a, 70b extend rearwardly of the carriage from the ends of member 66. A handle unit 72 includes an inverted U-shaped member 74 having downwardly extending legs 76a, 76b. The lower ends of the legs are each turned forwardly to telescopingly fit within the rear end of the respective side rails. The upper end of the member is turned rearwardly to form a handlebar 78 which the adult can use to push, pull, and steer the carriage.

Figures 15, 16A, 16B:
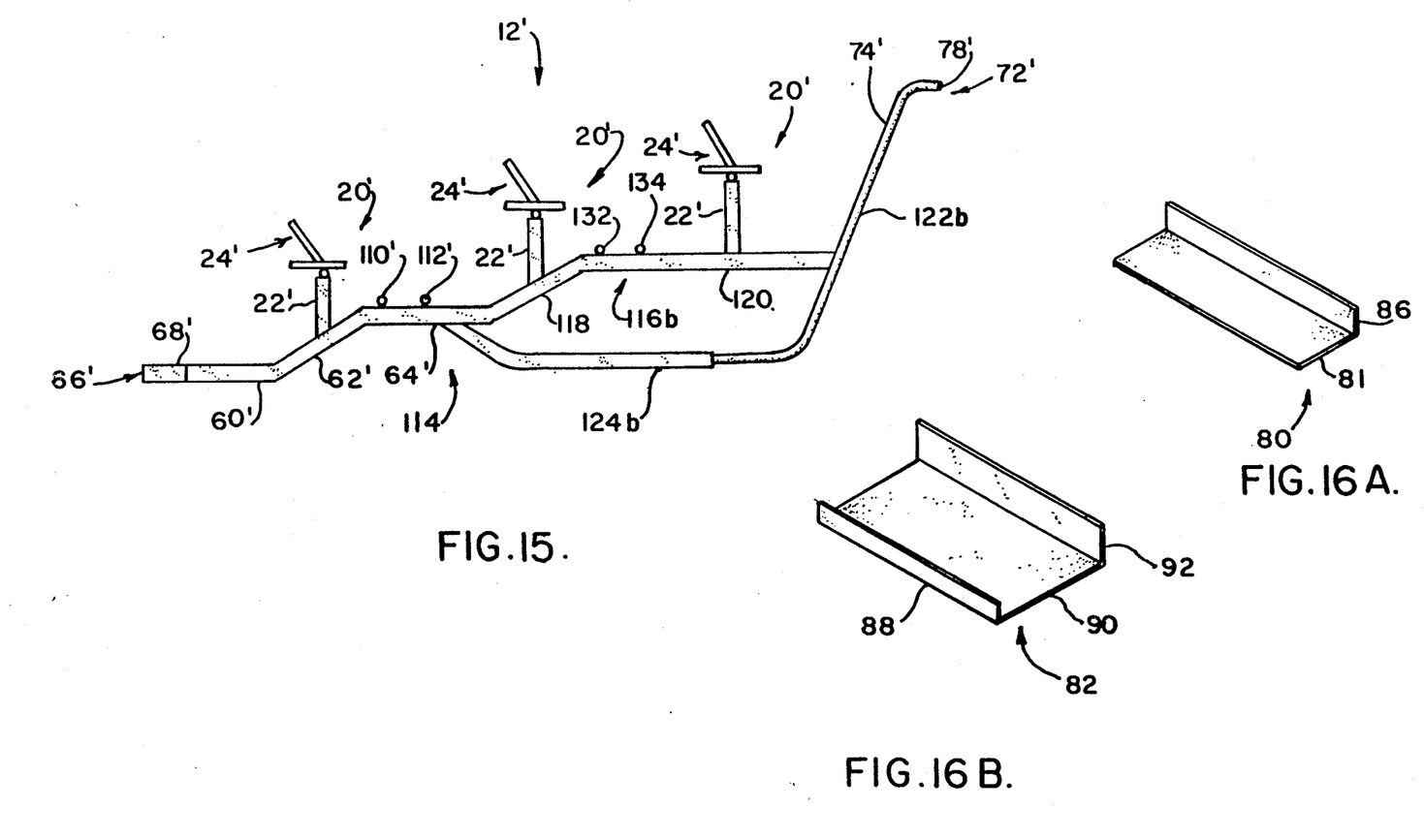

Referring to FIGS. 16a, 16b, respective flooring sections 80, 82 are attachable to the frame to create the tiers for the carriage. Section 80 comprises a flat sheet 83, preferably of polymer, although it may be constructed of other materials such as lightweight steel or similar metal whose upper surface has a rubber-like matting 84 laid over it to prevent children from slipping as they get on or off of the carriage during usage. The corners of the sheet are rounded to conform to the curvature of frame member 66. The length of the section is such that the feet of children seated in the front row of seats 34 can rest their feet on the mat. The back portion of section 80 is upwardly turned to form a lip 86 angled to conform to the slope of section 62 of legs 16a, 16b. The front, sides and rear portions of floor section 80 are secured to frame members 16a, 16b, 66 and 70a, 70b by, for example, screws.

Figure 6:
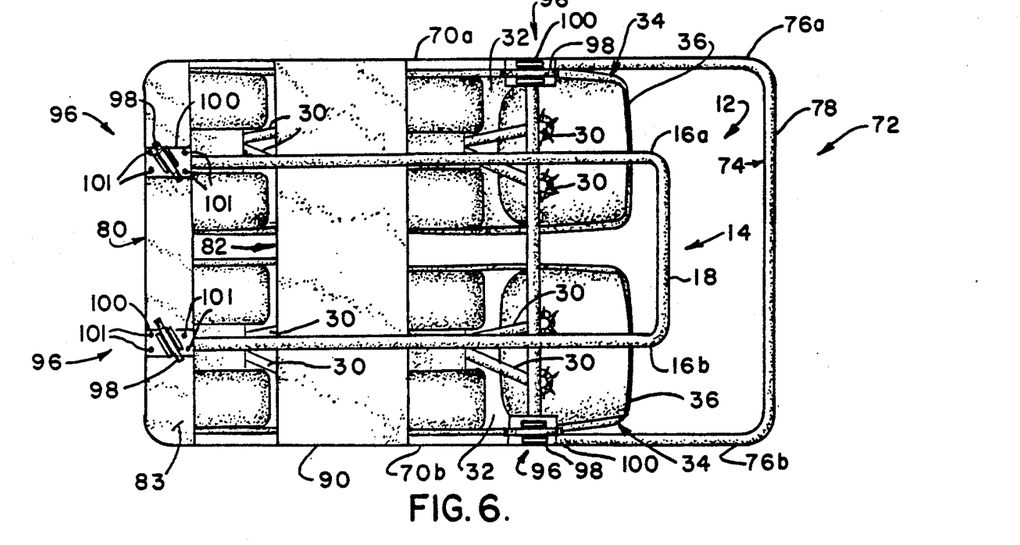
FIG. 6 is a bottom plan view of the carriage.
Figure 7:
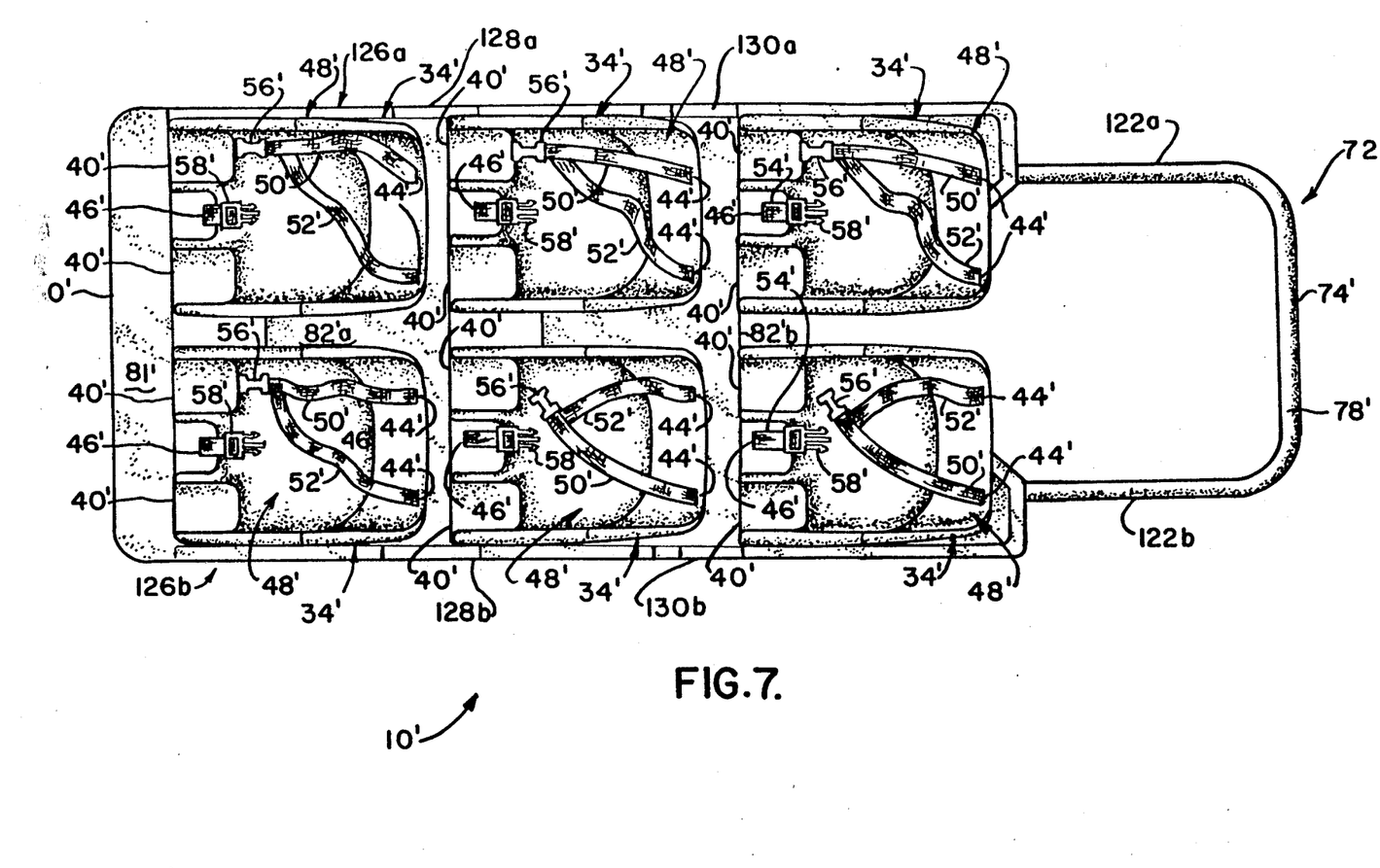
FIG. 7 is a top plan view of a second embodiment of a carriage of the present invention.
Figure 8:
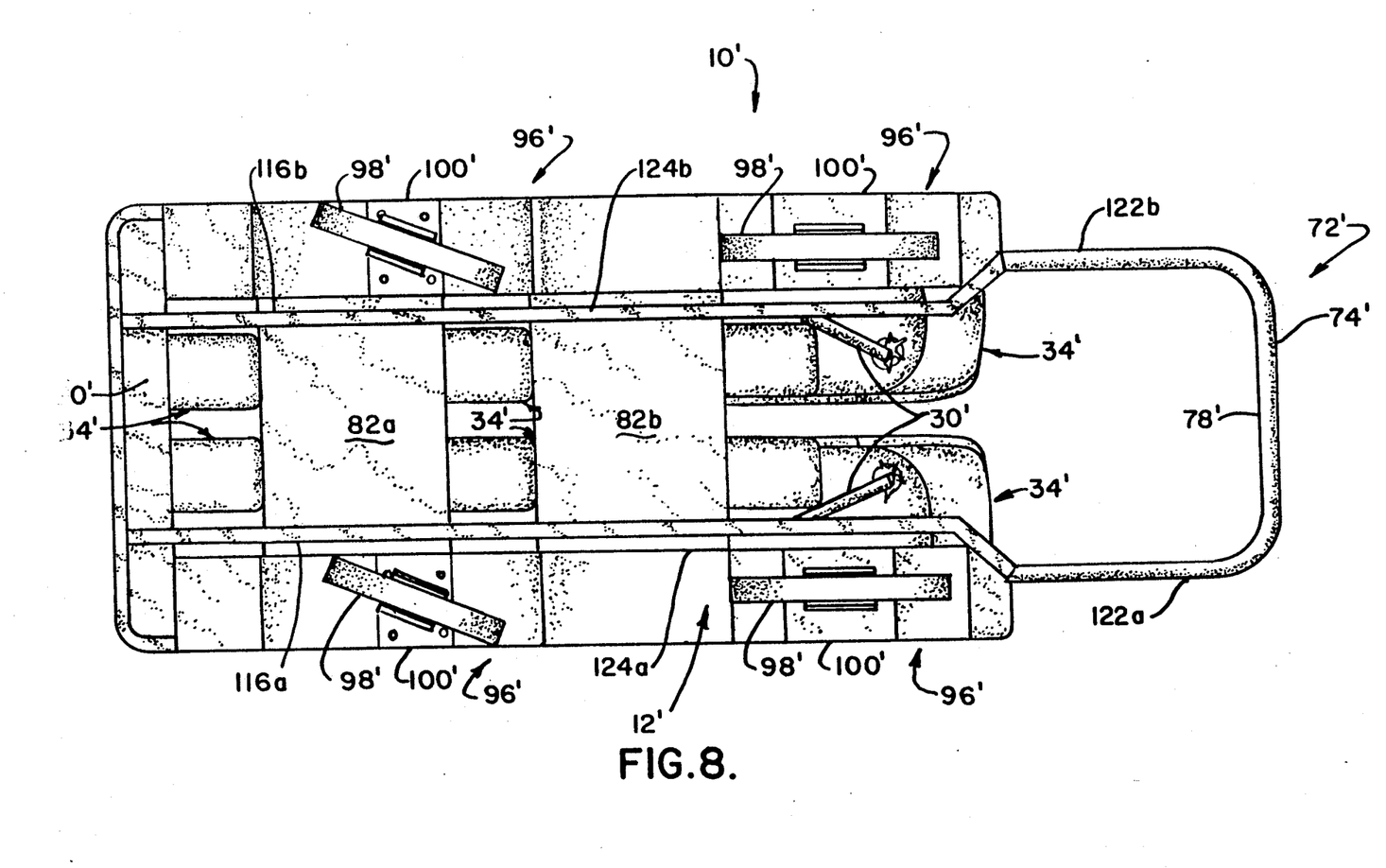
FIG. 8 is a bottom plan view of the carriage.
Figure 9:
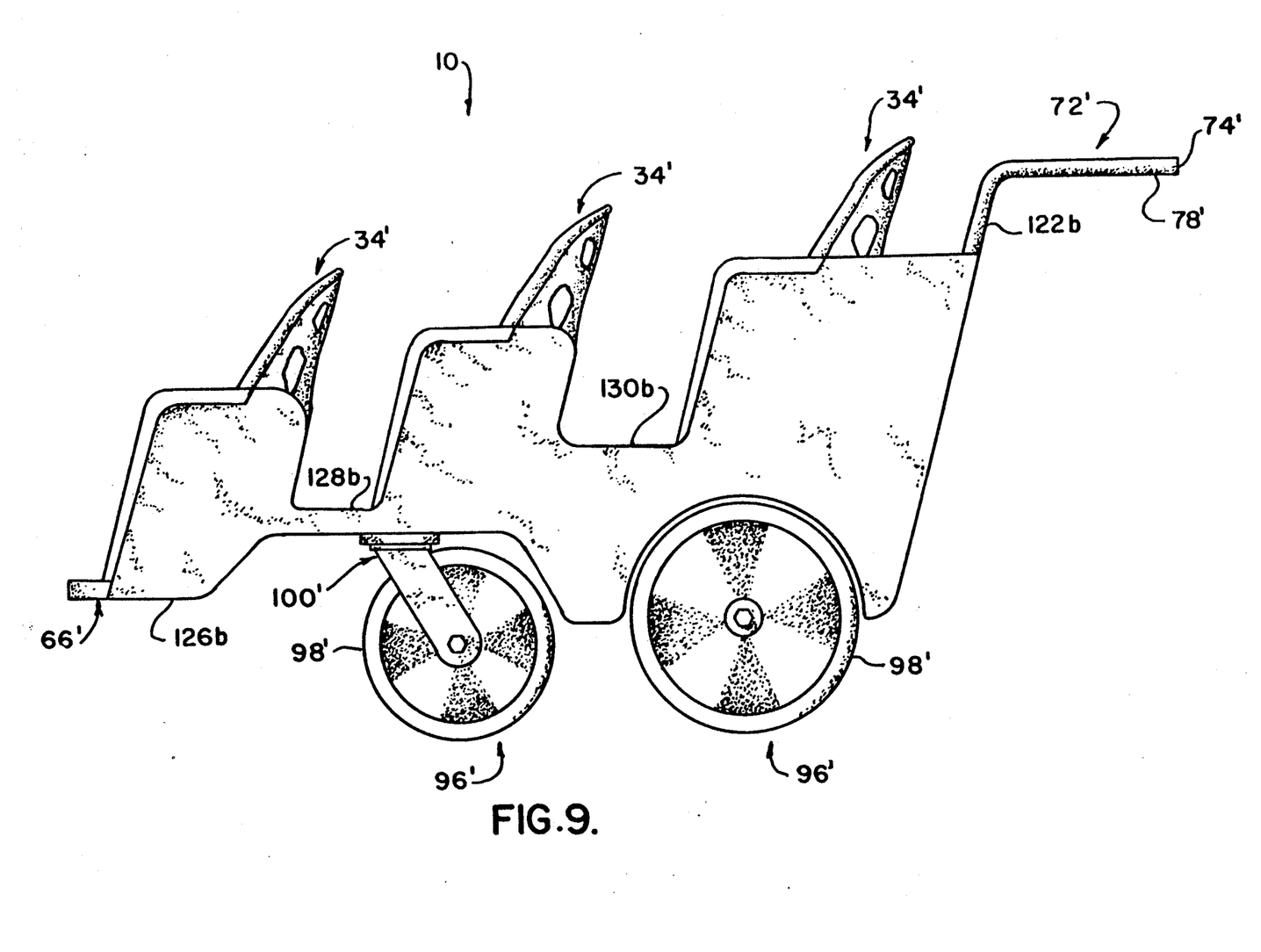
FIGS. 9, 10, and 11 are respective side, rear, and front elevational views of the carriage.
Figure 10:
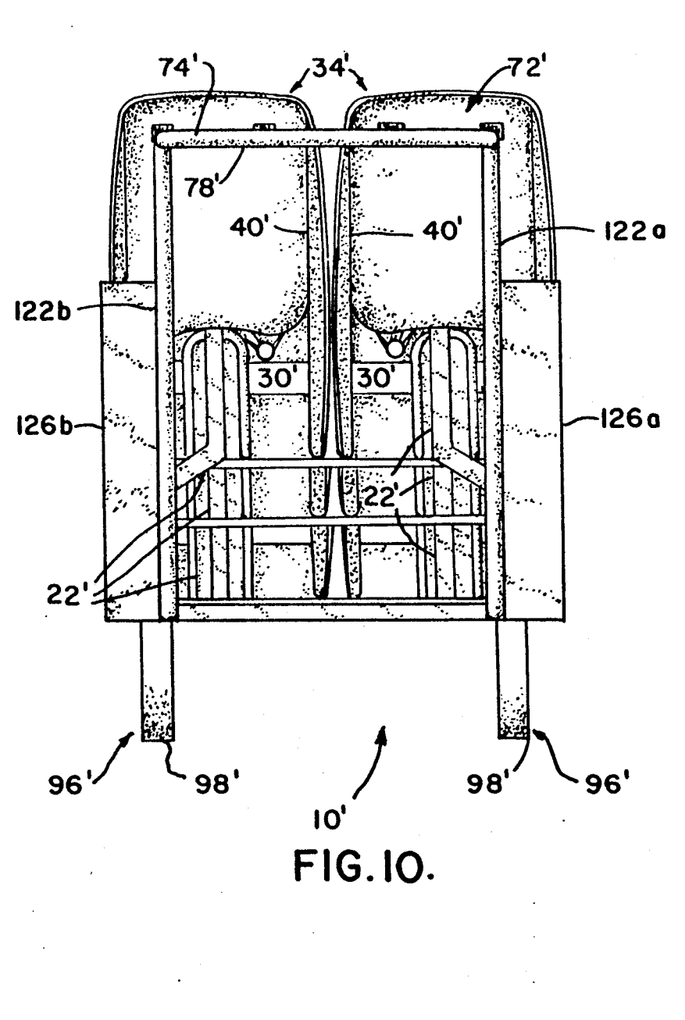
Figure 11:
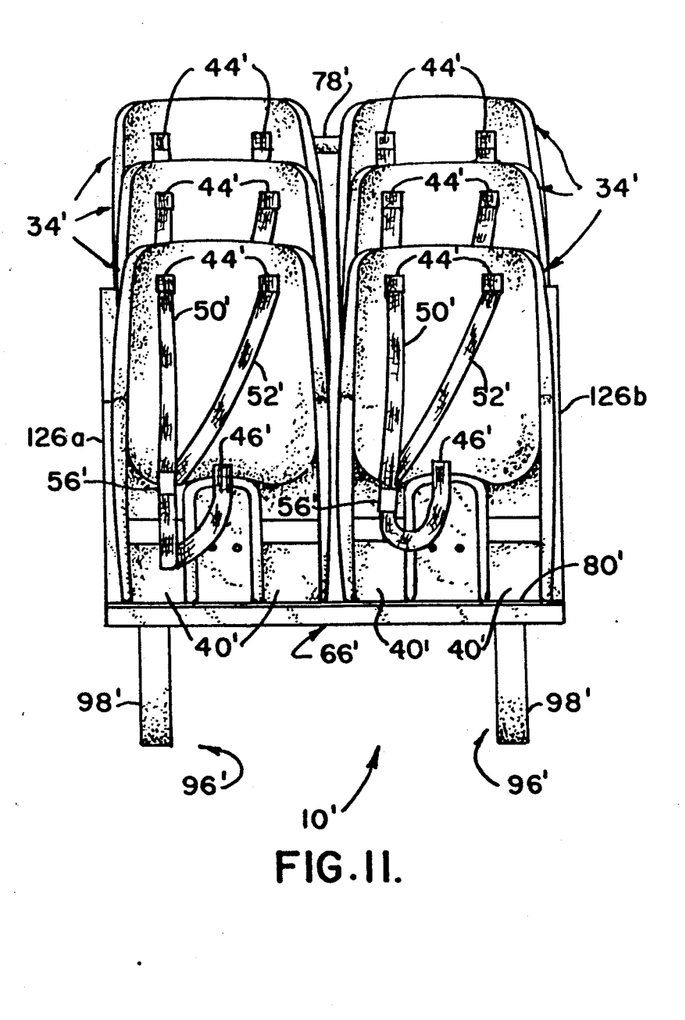

Floor section 82 has an upturned, front portion forming a lip 88, a flat central portion 90, and an upwardly turned rear portion forming a rear lip 92. This floor section is positioned over section 64 of legs 16a, 16b and is secured preferably through the application and usage of a double sided adhesive tape, or perhaps even can be connected through the use of screws, or the like. As best shown in FIGS. 2 and 6, floor section 82 is located between the rows of seats so children seated in the second row can rest their feet on the floor. Again, the upper surface of the floor section, which also comprises a step, is covered with a non-slip matting material 94.

Wheel units 96 are mounted to the underside of the frame assembly. Each unit includes a wheel 98 rotatably mounted on a bracket 100. The wheel units at the front end of the carriage are attached to the underside of floor section 80 by screws 101 or the like. These units are directly beneath the respective legs 16a, 16b of frame member 14 and the brackets 100 in which the wheels are mounted swivel so the wheels can turn to steer the carriage. The other two wheel units are located behind the rear row of seats 34 and beneath side rails 70a, 70b. The brackets 100 of these units do not swivel so their wheels move only in a straight line. A lateral support member 102 extends between the side rails at a point directly above the location of the rear set of wheels to reinforce the frame. Proper wheel positioning is provided to furnish stability and balance, and to prevent the carriage from tipping when in use, or when children are getting in and out of the device.

Next, carriage 10 includes side panels 104a and 104b respectively. These are made, for example, of a molded plastic or lightweight metal. The material is sufficiently sturdy to withstand objects bumping into it, to protect the occupants of the carriage; while at the same time, keeping the overall weight of the carriage light enough that it can be readily moved even when all the seats are occupied. The bottoms of each side panel are attached to the respective side rails 70a, 70b. The panel is stepped in height from front to rear with the height of the panel corresponding to the height of the seat at each seat location along the length of the carriage. The height is such that the edge of the side panels fit into the channels 42 on the outside of each seat 34. Thus, as shown in FIG. 1, the outer side of each seat overlays the side panel which acts as a reinforcement for the seat. The rear of the side panels conform to the slope of the legs 76a, 76b of handle 72 and are attached thereto. Further, each side panel has a cut-out 106a, 106b respectively, along its length to facilitate children climbing in and out of the carriage. The cut-out is located between the rows of seats and extends vertically downwardly from the top surface 108a, 108b of the respective side panels to the upper surface of the floor section 82. It will be understood that the side panels may be color molded, in order to display its preferred indicia, or the panels may be painted, particularly on their outside, and may even have embossed designs thereon, or decals, or other forms of decoration.

A pair of rods 110, 112 extend transversely of the carriage, and are generally square, in configuration, in cross section, or perhaps they can be made of round stock, and are attached to the upper surface of the legs 16a, 16b. The rods are parallel to and spaced apart from each other and the length of the rods corresponds to the approximate width of the carriage. The rods are located on section 64 of the legs forwardly of the seating assemblies 24 comprising the back row of the seats. The respective side panels as attached to the carriage are in proximity with the ends of these rods, and attain structural stability with respect thereto, since any inward shifting of the panels will encounter the rod ends, so as to prevent their buckling in such manner. In addition, the legs 16a, 16b provide support for the floor board that may be mounted thereon.

Referring to FIGS. 7-11 and 14, 15, a six passenger version of the carriage is indicated generally 10'. The carriage is designed for three rows of two abreast seating and is generally the same in appearance and construction to carriage 10. Frame 12' of the carriage includes a frame member 114 having respective legs 116a, 116b extending longitudinally of the frame.

Seating means 20' is attached to the respective legs of member 114 at points intermediate their length. The respective seating means are each identical to the means 20 previously described, and are arranged at the same intermediate points along legs 116a, 116b to provide the side-by-side seating arrangement. Each means 20' includes a post 22' extending vertically upwardly from the top of the leg, and a tubular member 24' attached to the top of the post and extending transversely to the longitudinal axis of the carriage. Member 24', as before, is generally L-shaped and has a long leg 26' secured to the post and an upwardly angling short leg 28'. A pair of mounting brackets 30' are attached to the top of the leg at angles to each other. The brackets extend outwardly toward the front of the carriage. Seats 34' which are the same as the seats 34 previously described are bolted to the brackets. The seats have a lower front portion 38' with leg wells 40' for the childrens' legs. Leg 28' of member 24' fits in a channel 42' formed on the inward side of the seat to brace the seat.

The seats have openings 44' in their upper back portion and an opening 46' between the leg wells. A safety harness 48' has straps 50', 52' inserted through openings 44', and a strap 54' inserted through opening 46'. Strap 52' is joined to strap 50' adjacent the end of the strap. Strap 50' has a buckle 56' into which a latch 58' on strap 54' is inserted.

Frame member 114 has a staight section 60' at the forward end of each leg followed by a first upwardly sloping section 62'. After another straight section 64', each leg has a second upwardly sloping section 118 followed by a third straight section 120. A frame member 66' extending orthogonally across the front of the carriage is attached to the legs and acts as a front bumper for the carriage. The outer ends of the member are both turned rearwardly as indicated at 68'. A handle unit 72' includes an inverted U-shaped member 74' having downwardly extending legs 122a, 122b. The lower ends of the legs are each turned forwardly to telescopingly fit within the rear end of respective side rails 124a, 124b which respectively extend rearwardly from section 64' of legs 116a, 116b. The upper end of member 74' is turned rearwardly to form a handlebar 78'.

Respective flooring sections 80', 82', as previously described, are used to create the tiers of the carriage. Section 80' fits over the front end of the frame and has a matting 84' laid over it. Floor section 82' is used twice; once (section 82'a) on the second tier of seats and again (section 82'b) with the third tier.

Wheel units 96' mount to the underside of the frame assembly and include a wheel 98' rotatably mounted on a bracket 100'. Again, the wheel units at the front end of the carriage swivel to help steer the carriage. The two rear wheels, which are larger in diameter than the two front wheels, do not swivel but move only in a straight line.

The carriage includes side panels 126a, 126b respectively. Each panel is stepped in height from front to rear and their height corresponds to the height of the seat at each seat location along the length of the carriage. The height is such that the edge of the side panels fit into the channels 42' on the outside of each seat 34'. The outer side of each seat overlays the adjacent side panel. Each side panel has a pair of cut-outs along its length. The first of these cut-outs 128a, 128b respectively, is located between the first and second rows of seats; and, the second of these cut-outs 130a, 130b respectively, is located between the second and third row. Again, it will be understood that the side panels may be painted or otherwise decorated.

A pair of rods 110', 112' extends transversely of the carriage, between the first and second row of seats and are attached to section 64' of legs 116a, 116b. A second pair of rods 132, 134 extends transversely of the carriage between the second and third row of seats and are attached to section 120 of legs 116a, 116b. Both pairs of rods are parallel to and spaced apart from each other and the length of the rods corresponds to the width of the carriage. Side panels 126a, 126b are in proximity with these rod ends, in order to stabilize the mounting of the side panels to the structure of this modified carriage.

Variations and modifications to this invention may occur to those skilled in the art upon reviewing the subject matter of this invention. Such variations or modifications, if within the spirit of this invention, are intended to be encompassed within the scope of any claims to patent protection issuing upon this invention. The description of the preferred embodiment provided herein is set forth for illustrative purposes only.

Having thus described the invention, what is claimed and desired to be protected by Letters Patent is:

1. A carriage for babies, infants and smaller children comprising:
   a frame;

wheel means attachable to the frame to move the carriage;

handle means attachable to the frame for pushing and pulling the carriage;

a multi-tiered seating assembly mounted on the frame, said seating assembly including seating means for at least two occupants on each tier, said seating means being arranged in adjacency;

said frame including a pair of parallel, spaced apart members extending longitudinally of said frame with the seating means being attached to each of the pair of parallel, spaced apart members at the same intermediate points so as to provide a side-by-side seating arrangement for the occupants; and each seating means including a post extending vertically upward from one of the pair of parallel, spaced apart members for supporting a seat and a seat mounted atop the post, the pair of parallel, spaced apart members each having progressively raised sections so to increase the height of the pair of parallel, spaced apart members from the front to the rear of the frame with each post being set on a successively higher section of the pair of parallel, spaced apart members so the occupants of the rearward seats are seated higher than those in the forward seats.

2. The carriage of claim 1 wherein the seating assembly has at least two tiers.

3. The carriage of claim 2 wherein the seating assembly has three tiers.

4. The carriage of claim 1 wherein the seating means further includes seat support means atop each post for securing a seat to the top of the post.

5. The carriage of claim 1 further including floor panels installable on the frame to provide a floor for the carriage, the floor panels having a base section on which occupants can stand and a vertical section which prevents occupants of the carriage from getting their legs caught between the seats.

6. The carriage of claim 5 further including side panels for the carriage attachable to the frame.

7. The carriage of claim 5 wherein the frame includes a plurality of rods extending transversely of the member with the side panels being arranged in proximity therewith and being stabilized with respect to the ends of said rods.

8. The carriage of claim 7 wherein each side panel is stepped in height from front to rear with the height of the side panel corresponding to the height of the seat at each seat location therealong, and the outer side of each seat overlaying the top of the side panel for the side panel to support the seat.

9. The carriage of claim 8 wherein each side panel has at least one cut-out extending vertically downwardly from the top of the panel to the top of the floor panel adjacent the side panel, each cut-out being immediately in front of a seat so to provide access to the seat.

10. The carriage of claim 5 wherein the wheel means includes a wheel positioned at each corner of the carriage.

11. The carriage of claim 10 wherein the wheels at the front end of the carriage are rotatably mounted for steering the carriage.

12. The carriage of claim 10 wherein the handle means includes a a vertically extending, inverted U-shaped member attached to the rear of the frame.

13. The carriage of claim 4 wherein each seat includes a harness for strapping an occupant into each respective seat.

* * * * *

UNITED STATES PATENT AND TRADEMARK OFFICE
CERTIFICATE OF CORRECTION

PATENT NO. : 5,033,761

DATED : July 23, 1991

INVENTOR(S) : Ray G. Kelly

It is certified that error appears in the above-identified patent and that said Letters Patent is hereby corrected as shown below:

Claim 7, column 8, line 7, change "5" to ---6---.

Signed and Sealed this

First Day of December, 1992

*Attest:*

DOUGLAS B. COMER

*Attesting Officer*     *Acting Commissioner of Patents and Trademarks*